US012129142B2

(12) United States Patent
Haigis et al.

(10) Patent No.: US 12,129,142 B2
(45) Date of Patent: Oct. 29, 2024

(54) CUTTER FOR SELF-ADHESIVE LINERLESS ENDLESS TAPE LABELS

(71) Applicant: Bizerba SE & Co. KG, Balingen (DE)

(72) Inventors: Joerg Haigis, Balingen (DE); Moritz Dehner, Hechingen-Stetten (DE); Pascal Eppler, Albstadt-Laufen (DE); Alexander Hirsch, Stuttgart (DE); Peter Will, Balingen (DE)

(73) Assignee: Bizerba SE & Co. KG, Balingen (DE)

( * ) Notice: Subject to any disclaimer, the term of this patent is extended or adjusted under 35 U.S.C. 154(b) by 285 days.

(21) Appl. No.: 17/370,652

(22) Filed: Jul. 8, 2021

(65) Prior Publication Data

US 2022/0009741 A1 Jan. 13, 2022

(30) Foreign Application Priority Data

Jul. 10, 2020 (EP) .................................... 20185212

(51) Int. Cl.
*B65H 35/06* (2006.01)
*B26D 1/04* (2006.01)
(Continued)

(52) U.S. Cl.
CPC ............. *B65H 35/06* (2013.01); *B26D 1/045* (2013.01); *B65C 9/1803* (2013.01);
(Continued)

(58) Field of Classification Search
CPC .. B26D 2007/005; B26D 1/205; B26D 1/185; B26D 3/085; B26D 7/2621;
(Continued)

(56) References Cited

U.S. PATENT DOCUMENTS 791,793 A * 6/1905 Johnson .................. B26B 25/00
83/485
4,440,055 A 4/1984 Gelfand
(Continued)

FOREIGN PATENT DOCUMENTS

DE 199 58 274 A1 6/2001
DE 202004019430 U1 * 4/2005 ............... B26D 7/22
(Continued)

OTHER PUBLICATIONS

European Search Report dated Nov. 30, 2020 of corresponding European Patent Application No. 20185212.6 (three pages).
(Continued)

*Primary Examiner* — Jonathan G Riley
(74) *Attorney, Agent, or Firm* — Kilpatrick Townsend & Stockton LLP

(57) ABSTRACT

The invention relates to a cutter for self-adhesive linerless endless tape labels, said cutter comprising a transport roller, which is rotatable about an axis of rotation, and a blade unit that comprises a blade carriage, which is linearly travelable in parallel with the axis of rotation of the transport roller, and a cutting blade that is rotationally fixedly held at the blade carriage and that is directed in the direction toward the transport roller, wherein the endless tape labels can be led between the transport roller and the blade unit. The blade unit comprises a blade holder that forms an assembly with the cutting blade, in which assembly the cutting blade projects with a fixed overhang over the blade holder, with the assembly being displaceably fastened to the blade carriage and a spring device, in particular a compression spring, being provided that preloads the assembly into an extended position.

21 Claims, 11 Drawing Sheets

(51) Int. Cl.
*B65C 9/18* (2006.01)
*B65H 35/00* (2006.01)

(52) U.S. Cl.
CPC ......... *B65H 35/002* (2013.01); *B65H 35/008* (2013.01); *B65H 2301/51532* (2013.01); *B65H 2701/192* (2013.01)

(58) Field of Classification Search
CPC .................. B26D 7/2635; B26D 1/045; B65C 2009/1834; B65C 9/1803; Y10T 83/8847; Y10T 83/8844; B65H 35/06; B65H 35/002; B65H 35/008; B65H 2301/51532
See application file for complete search history.

(56) References Cited

U.S. PATENT DOCUMENTS

| | | | | |
|---|---|---|---|---|
| 4,535,664 | A | 8/1985 | Raymond | |
| 4,732,069 | A * | 3/1988 | Wood | B26D 7/2628 83/881 |
| 4,979,838 | A | 12/1990 | Yokota et al. | |
| 5,069,097 | A * | 12/1991 | Mori | B26D 1/185 83/458 |
| 5,442,983 | A | 8/1995 | D'Angelo et al. | |
| 5,611,253 | A | 3/1997 | Saito et al. | |
| 5,819,618 | A | 10/1998 | Rodriguez | |
| 6,651,537 | B1 * | 11/2003 | Pfeiffer | B65H 35/06 83/698.21 |
| 10,265,968 | B2 | 4/2019 | Holike et al. | |
| 10,494,131 | B2 | 12/2019 | Mistyurik et al. | |
| 2002/0112586 | A1 * | 8/2002 | Mori | B23D 35/008 83/563 |
| 2007/0028738 | A1 * | 2/2007 | Chan | B26D 1/205 83/485 |
| 2008/0250909 | A1 | 10/2008 | Sudmalis et al. | |
| 2011/0314992 | A1 * | 12/2011 | Ishihara | B26D 1/185 83/698.41 |
| 2014/0028752 | A1 | 1/2014 | Kikura et al. | |
| 2018/0311979 | A1 * | 11/2018 | Mistyurik | B26D 1/205 |
| 2018/0312289 | A1 | 11/2018 | Gomes Da Costa et al. | |
| 2019/0202654 | A1 | 7/2019 | Dehner et al. | |
| 2020/0087015 | A1 | 3/2020 | Stern et al. | |
| 2022/0009190 | A1 | 1/2022 | Haigis et al. | |

FOREIGN PATENT DOCUMENTS

| | | | |
|---|---|---|---|
| EP | 1 356 947 | A1 | 10/2003 |
| EP | 1 559 566 | A1 | 8/2005 |
| EP | 3 505 355 | A1 | 7/2019 |
| EP | 3 318 412 | B1 | 10/2019 |
| EP | 3 619 012 | A1 | 3/2020 |
| GB | 2 289 430 | A | 11/1995 |
| WO | 2018/204397 | A1 | 11/2018 |

OTHER PUBLICATIONS

European Search Report dated Mar. 5, 2021 of corresponding European Patent Application No. 20185206.8 (four pages).
Non-Final Office Action dated Sep. 14, 2022 in related U.S. Appl. No. 17/370,708 (eleven pages).
Notice of Allowance dated Mar. 8, 2023 in U.S. Appl. No. 17/370,708 (nine pages).

* cited by examiner

CUTTER FOR SELF-ADHESIVE LINERLESS ENDLESS TAPE LABELS

CROSS-REFERENCE TO RELATED APPLICATIONS

This application claims the benefit of EP 20185212.6, filed Jul. 10, 2020.

BACKGROUND OF THE INVENTION

The presents relates to a cutter for tape labels.

BRIEF SUMMARY OF THE INVENTION

The invention relates to a cutter for self-adhesive linerless endless tape labels, said cutter comprising a transport roller, which is rotatable about an axis of rotation, and a blade unit that comprises a blade carriage, which is linearly travelable in parallel with the axis of rotation of the transport roller, and a cutting blade that is rotationally fixedly held at the blade carriage and that is directed in the direction toward the transport roller, wherein the endless tape labels can be led between the transport roller and the blade unit. Such a cutter is known from document DE 199 58 274 A1.

To be able to process such linerless labels, which are coated with an adhesive at one side, a cutter or a label printer having a cutter, by which the labels are cut off from the endless tape, is required. For this purpose, the transport roller of the cutter, in its function as a counterholder for the cutting blade in accordance with document DE 199 58 274 A1, is provided with an elastomer coating into which the cutting blade can penetrate on the cutting off of the labels.

It is disadvantageous in this respect that the cutting blade successively damages the elastomer coating and the transport roller is hereby subjected to wear. This is in particular disadvantageous because the labels are disposed on the transport roller with their adhesive-coated side. However, for a trouble-free transport of the endless tape labels, it is essential that the surface of the transport roller offers the adhesive no adhesion or only as small as possible an adhesion. This property of the transport roller, particularly in the case of a transport roller provided with a non-stick coating, is lost over time through the wear due to the penetration of the cutting blade.

It is the underlying object of the invention to provide a cutter of the initially named kind that also enables a problem-free transport of the endless tape layers in the long term.

This object is satisfied by a cutter having the features of independent claim 1, and in particular in that the blade unit comprises a blade holder that forms an assembly with the cutting blade, in which assembly the cutting blade projects with a fixed overhang over the blade holder, with the assembly being displaceably fastened to the blade carriage and a spring device, in particular a compression spring, being provided that preloads the assembly into an extended position.

The cutter in accordance with the invention has the advantage that the cutting blade does not penetrate or at least penetrates less deeply into the transport roller on the cutting off of the labels since the cutting blade, due to its spring-loaded displaceable fastening, can deflect in the direction away from the transport shaft on contact with the surface of the transport shaft. Nevertheless, sufficient pressure is exerted onto the cutting blade by the spring force to achieve a clean cut on the cutting off of a label. Since the cutting blade is displaced together with the blade unit and always has the same fixed overhang with respect to said blade unit, it can be ensured that the penetration depth of the cutting blade into the endless tape labels always remains the same and that the labels can also be reliably cut off in the case of tolerance-induced irregularities in the surface of the transport roller.

Provision is preferably made that the blade holder and the cutting blade are each plate-shaped, with the blade holder and the cutting blade contacting one another with their flat sides. A plate-shaped component is simultaneously light and stable. Two plate-shaped components, which contact one another with their flat sides, reinforce one another.

Furthermore, it is preferred if the cutting blade is arranged between the blade carriage and the blade holder. The cutting blade can be supported at both sides between the blade holder and the blade carriage and can thus be particularly securely held.

The blade carriage can have a base body and a prolongation, in particular a plate-shaped prolongation, which projects from the base body in the direction toward the transport roller and to which the assembly is displaceably fastened, with preferably the flat sides of the plate-shaped prolongation being aligned in parallel with a plane of movement of the cutting blade on the travel of the blade carriage and/or being aligned in parallel with the plane of movement of the cutting blade on the displacement of the assembly. The stability of the arrangement can hereby be increased.

The spring device is preferably supported at the blade carriage, in particular at the aforementioned base body, on the one hand, and at the assembly, on the other hand. Alternatively or additionally, it is preferred if the spring device acts directly on both the blade holder and the cutting blade. A compact design of the arrangement is hereby made possible in each case.

In accordance with an embodiment of the invention, the blade unit comprises a fastening screw by which the assembly is displaceably fastened to the blade carriage, with the assembly being received with clearance between a head of the fastening screw and the blade carriage in an axial direction of the fastening screw. A secure fastening can be achieved in a simple manner by the fastening screw. In order nevertheless to ensure its displaceability, the assembly is received with clearance between the head of the fastening screw and the blade carriage.

To enable the clearance of the assembly between the head of the fastening screw and the blade carriage, the blade unit preferably comprises a spacer sleeve that at least extends through the assembly, with a shaft of the fastening screw at least extending into the spacer sleeve, and with the head of the fastening screw abutting an axial end of the spacer sleeve to enable the clearance.

In this respect, provision can be made that the spacer sleeve, with its other axial end, abuts a side of the blade carriage, in particular of the aforesaid prolongation, facing the assembly and the shaft of the fastening screw extends through the spacer sleeve up to and into the blade carriage, in particular the prolongation, with the fastening screw being screwed in the blade carriage, in particular the prolongation, and with an extent of the spacer sleeve being greater in the axial direction than an extent of the assembly.

Alternatively thereto, provision can be made that the spacer sleeve extends through the assembly and the blade carriage, in particular the aforementioned prolongation, and said spacer sleeve, with a flange formed at its other axial end, abuts a side of the blade carriage, in particular of the prolongation, remote from the assembly, with the fastening screw being screwed into the spacer sleeve, and with the extent of the spacer sleeve being greater in the axial direction than the common extent of the assembly and of the blade carriage, in particular of the prolongation.

Provision is preferably made that an elongate hole is at least formed in the blade holder, through which elongate hole the fastening screw, and in particular the aforementioned spacer sleeve, extends, with the assembly being displaceable in the direction of the elongate hole. The cutting blade can then be arranged in a region of the blade holder that is not in a direct contact with the fastening screw. However, the displaceability of the assembly can also be made possible in another way, for example if the cutting blade is arranged at the side of the blade holder remote from the blade carriage. The head of the fastening screw can then be captured and displaceably guided in a linear guide formed at the blade holder and having abutments at both sides. A respective elongate hole is in particular formed both in the blade holder and in the cutting blade, which elongate holes are coordinated with another and through which in each case the fastening screw, and in particular the aforementioned spacer sleeve, extends, with the assembly being displaceable in the direction of the two elongate holes. This can in particular be the case if the dimensions of the blade holder and of the cutting blade are at least approximately equal, as is preferred for a stable and compact design of the assembly.

In accordance with a further embodiment of the invention, the blade holder and the cutting blade are plugged together to form the assembly, with the blade holder for this purpose having at least one pin projecting in the direction of the cutting blade and the cutting blade having at least one opening receiving the respective pin. A stable assembly can hereby be realized in a simple manner.

It is preferred if the blade holder has two pins and the cutting blade has two openings that are disposed opposite one another with respect to the fastening screw. Due to the symmetrical design resulting therefrom, a particularly stable assembly is provided.

It is furthermore preferred if the respective pin of the blade holder extends through the respective opening of the cutting blade and up to and into a respective elongate hole formed in the blade carriage. A security against rotation for the assembly with respect to the blade carriage is hereby simultaneously ensured by the respective pin. However, it is also possible for a separate security against rotation to be provided, for example two holding arms that project from the blade holder in the direction of the blade carriage and that contact the blade carriage, in particular the aforementioned prolongation, at both sides.

The overhang of the cutting blade over the blade holder can amount to a value that is between 0.1 mm and 0.8 mm, preferably between 0.2 mm and 0.3 mm. It can hereby be ensured that the cutting blade only projects slightly, on the one hand, but projects sufficiently far beyond the blade holder, on the other hand, in order to safely cut off the labels.

In accordance with a further embodiment of the invention, a threaded spindle, comprising a threaded rod and the blade carriage as a spindle nut, and an electric motor driving the threaded rod are provided to linearly travel the blade carriage. A precise travel of the blade carriage is hereby made possible in a simple manner. A straight-line guide extending in parallel with the threaded rod is preferably provided in the form of a guide bar which extends through an aperture formed in the blade carriage and along which the blade carriage is guided in a linearly travelable manner. The blade carriage can hereby be kept particularly stable.

The blade carriage is travelable to and fro between a first end position and a second end position, with the cutting blade having a blade edge at the respective leading edge in both directions of travel of the blade carriage. Thus, a label can be cut off in the forward run and the following label can be cut off in the return run of the blade carriage. After the cutting off of a label, the blade carriage therefore does not first have to be returned to the first end position before the next label can be cut off such that the throughput can be increased. The two blade edges preferably together form a V shape in the plane of movement of the cutting blade on the travel of the blade carriage. Thus, particularly clean cuts can be achieved on the cutting off of the labels since, on the cutting off, the two blade edges each also have a force component that presses onto the endless tape labels from above.

The blade carriage is in particular linearly travelable transversely, in particular perpendicular, to a transport direction of the self-adhesive linerless endless tape labels and/or the assembly is linearly displaceably fastened to the blade carriage. The cutting blade in particular projects with the fixed overhang over an end face of the blade holder disposed in the direction toward the transport roller. The transport roller can be provided with a non-stick coating or can be produced from a non-stick material. The transport roller is preferably a driven transport roller such that the endless tape labels are also pulled and held under tension in the region of the cutter. A print roller of a label printer, which is driven by an electric motor and into which the cutter is installed, as a rule nevertheless provides a controlled transport of the endless tape labels. However, the transport roller can generally also be a non-driven transport roller that runs along.

The present invention further relates to a label printer comprising a cutter for self-adhesive linerless endless tape labels, as explained above.

The present invention additionally relates to a scale, in particular to a store scale, comprising a label printer such as has been explained above.

Further advantageous embodiments of the invention are described in the dependent claims, in the description of the Figures, and in the drawing.

BRIEF DESCRIPTION OF THE DRAWINGS

The invention will be described in the following by way of example with reference to the drawing. There are shown FIG. 1 a scale in accordance with the invention, in particular a store scale, with a label printer in accordance with the invention.

DETAILED DESCRIPTION OF THE INVENTION

Figure 1:
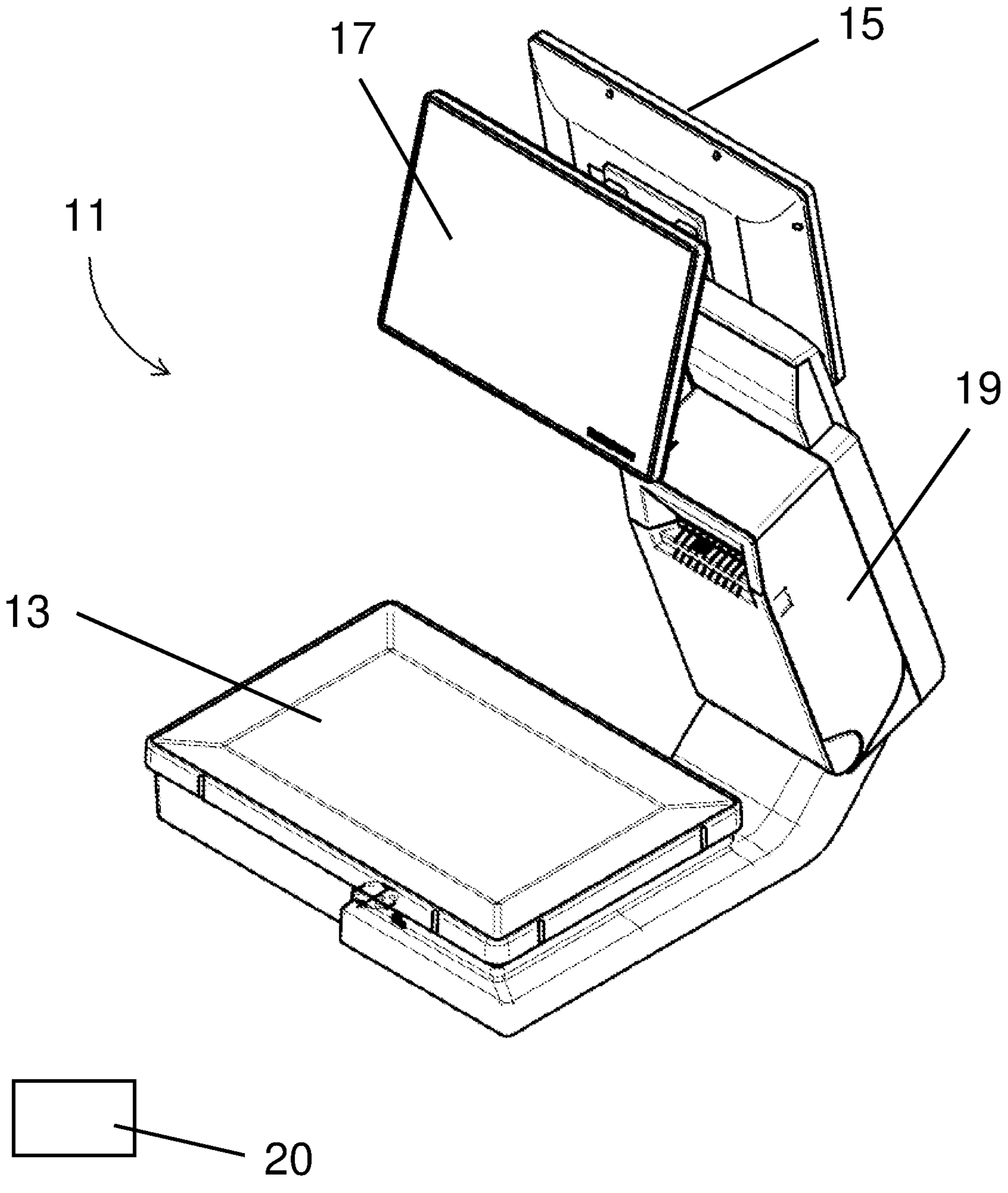

The exemplary store scale 11 shown in FIG. 1 comprises a load plate 13 that determines the weight of an article disposed on it, with the weight being displayed both on a display 15 for the customer and on a display 17 for the salesperson. The display 17 is configured as a touch screen such that the store scale 11 can also be operated via it. An identification number (PLU) associated with the respective article can be input via the touch screen 17 such that a price for the article can be calculated while adding the weight, said price then likewise being displayed on the two displays 15, 17. Furthermore, the store scale comprises a label printer 19 to print the weight, the name of the article, and the calculated price on the label. Furthermore, in FIG. 1, a control device 20 of the store scale 11 is schematically shown that is integrated in the store scale 11 and that is configured to control the operation of the store scale 11, in particular including the label printer 19.

Figure 2A:
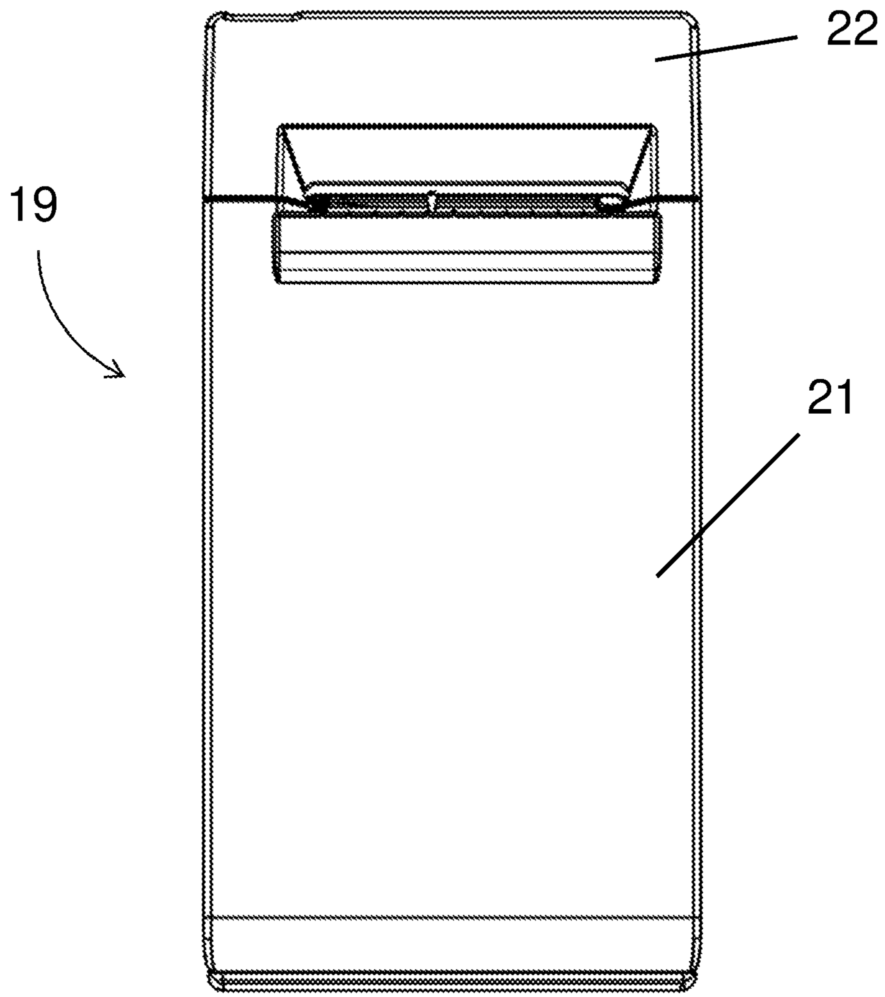
FIGS. 2A, B the label printer of FIG. 1 in an individual representation with a front-side cover and in a representation in which the front-side cover is omitted such that a cutter in accordance with the invention is visible.
Figure 2B:
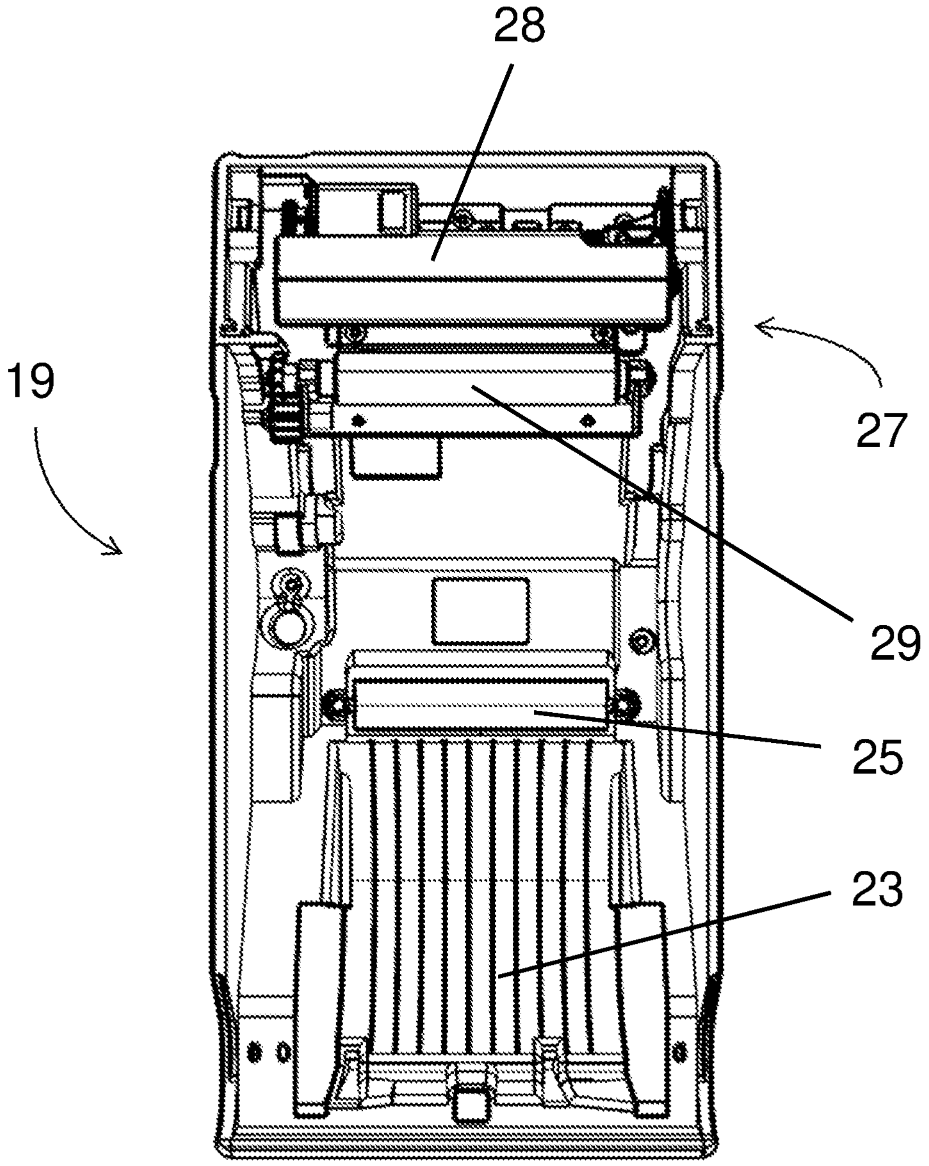

The label printer 19 is shown from the front in an individual representation in FIG. 2A. In FIG. 2B, a front-side cover of the label printer 19 in the form of a flap 21 and a cover section 22 separate therefrom are omitted such that the interior of the label printer 19 can be seen. A receiver 23 for a label roll and a deflection roller 25 are visible in the interior of the label printer 19. A printhead and a print roller of the label printer 19 are, in contrast, not visible in FIG. 2B.

The label printer 19 can in particular be operated with self-adhesive linerless endless tape labels. Therefore, the label printer 19 has a cutter 27 (which is partly concealed by a cover plate 28 in FIG. 2B) by which the labels are cut off from the endless tape. As can be seen from FIG. 3, the cutter 27 comprises a driven transport roller 29 rotatable about an axis of rotation for the endless tape labels. Furthermore, a blade unit 31 is provided that comprises a blade carriage 33 (cf. FIGS. 4A to 6B), which is linearly travelable in parallel with the axis of rotation of the transport roller 29, and a plate-shaped cutting blade 34 that is rotationally fixedly held at the blade carriage 33 and that is directed in the direction toward the transport roller 29. However, the label printer 19 can generally also be operated with receipt paper. The blade carriage 33 is configured as a spindle nut that has a passage 35 having an internal thread and that is driven in a travelable manner via a threaded rod 37, with which it forms a threaded spindle, by the electric motor 39 in both axial directions of the threaded rod 37. To ensure a stable guidance of the blade carriage 33 on the travel of the blade carriage 33, the cutter 27 furthermore comprises a straight-line guide that extends in parallel with the threaded rod 37 and that is configured as a guide bar 41 that is round in cross-section and that extends through an aperture 43 formed in the blade carriage 33. The aperture 43 has a cross-section in the form of an elongate hole such that tolerances in the spacing between the threaded rod 37 and the guide bar 41 can be compensated.

Figure 3:
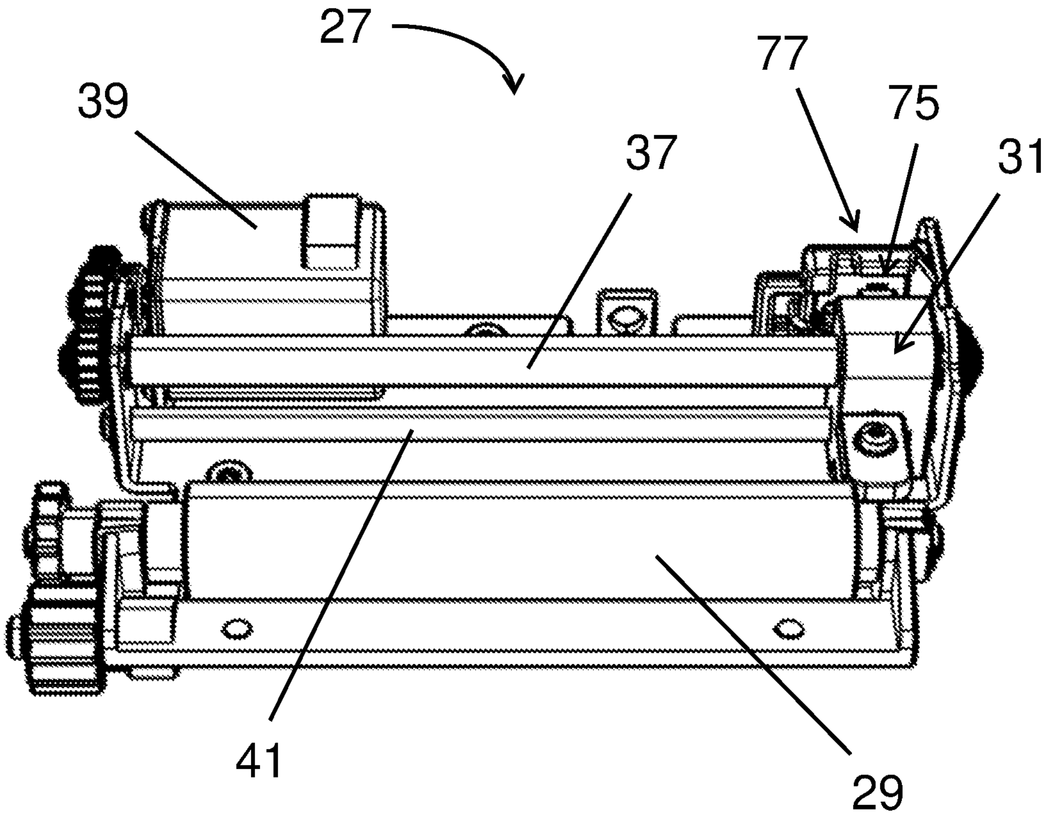
FIG. 3 the cutter of FIG. 2B in an individual representation with a blade unit.

The self-adhesive linerless endless tape labels are led between the transport roller 29 and the blade unit 31, wherein the adhesive-coated side of the endless tape labels faces the transport roller 29 that acts as a counterholder for the blade unit 31, in particular the cutting blade 34 of the blade unit 31. The two mutually opposite directions of travel of the blade carriage 33 in this respect run perpendicular to the transport direction of the endless tape labels. In FIGS. 2B and 3, the printhead and the print roller are located behind or below the transport roller 29 and are thus—as already mentioned above—not visible in the Figures.

The blade carriage 33 has a base body 45 and a plate-shaped prolongation 47 which projects from the base body 45 in the direction toward the transport roller 29 and at which the cutting blade 34 is held by means of a plate-shaped blade holder 49 of the blade unit 31. The cutting blade 34 is in this respect arranged between the prolongation 47 and the blade holder 49. The prolongation 47, the cutting blade 34, and the blade holder 49 are in this respect arranged contacting one another with their flat sides. The flat sides of these components are thus oriented in parallel with the plane of movement of the cutting blade 34 on the travel of the blade carriage 33. The passage 35 for the threaded rod 37 and the aperture 43 for the guide bar 41 are each provided in the base body 45.

Figure 8A:
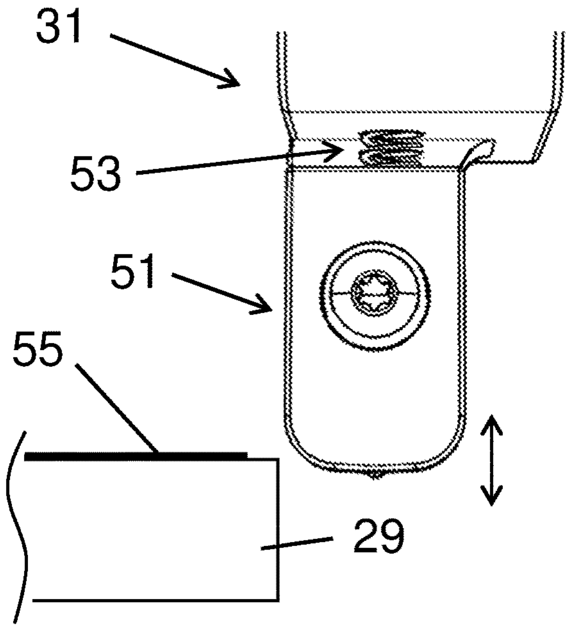
FIGS. 8A, B the blade unit in accordance with FIG. 4A in a representation with the assembly extended and in a representation with the assembly retracted.
Figure 8B:
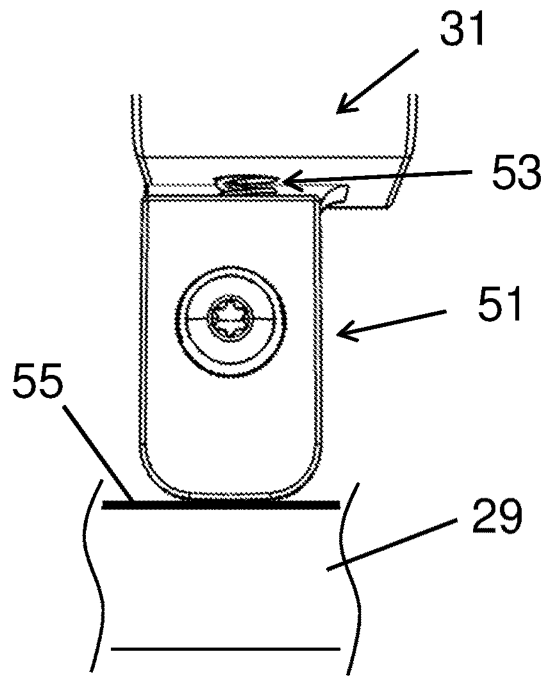

The blade holder 49 and the cutting blade 34 form an assembly 51 (cf. FIGS. 5A, 5B, 6B and 7) that is displaceably fastened to the prolongation 47 of the blade carriage 33 (cf. the respective double arrow in FIGS. 5A and 8A), that is pressed into an extended position (cf. FIG. 8A) by a spring device 53 in the form of a compression spring, and that is pressed back into a retracted position (cf. FIG. 8B) against the spring force of the spring device 53 on a placement of the blade unit 31 onto endless tape labels 55 passing between the transport roller 29 and the blade unit 31. In this respect, the spring device 53 is supported at the base body 45 with the one end and at the assembly 51 with the other end, and indeed both at the blade holder 49 and at the cutting blade 34.

The cushioned support of the cutting blade 34 or of the assembly 51 has the advantage that the cutting blade 34 or the tip of the cutting blade 34 does not penetrate or at least hardly penetrates into the surface of the transport roller 29 on the cutting off of a label, but is rather urged back by a distance with respect to the extended position that is predefined by the distance relationships between the blade unit 31 and the transport roller 29. It can hereby be prevented that the surface of the transport roller 29 is roughened by a continuous cutting in. A surface roughened in such a manner would namely have the result that the endless tape labels adhere more strongly to the transport roller 29 with their adhesive-coated sides over time, whereby a smooth transport of the endless tape labels would be disrupted.

Figure 4A:
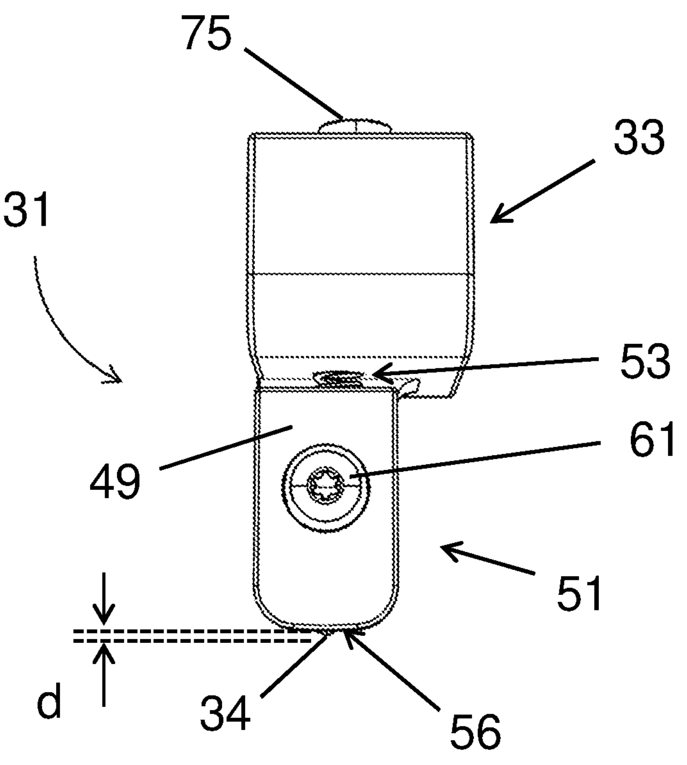
FIGS. 4A, B the blade unit of FIG. 3 in an individual representation with an assembly comprising a blade holder and a cutting blade in a front view and in a representation in which the blade holder is masked.
Figure 4B:
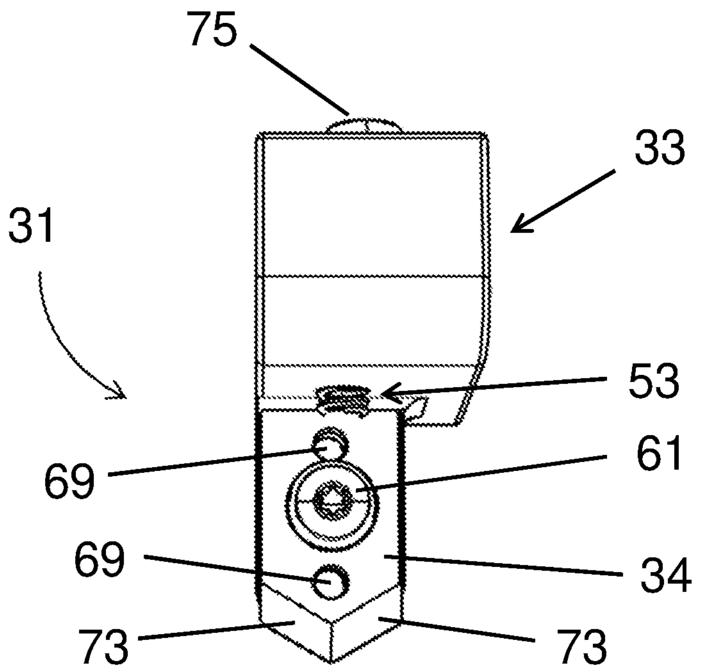
Figure 5A:
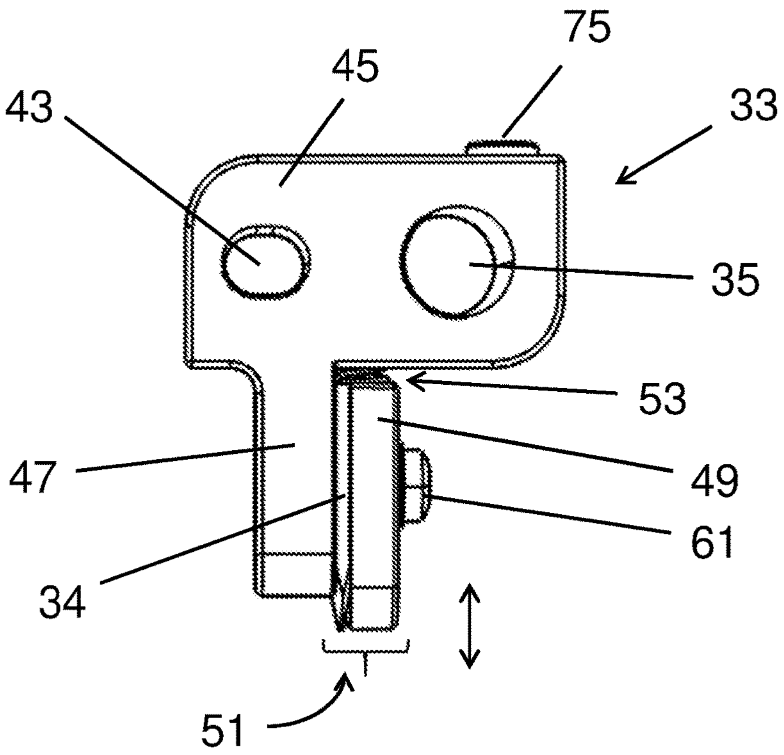
FIGS. 5A, B the blade unit of FIG. 4A in a side view and in an exploded representation.
Figure 5B:
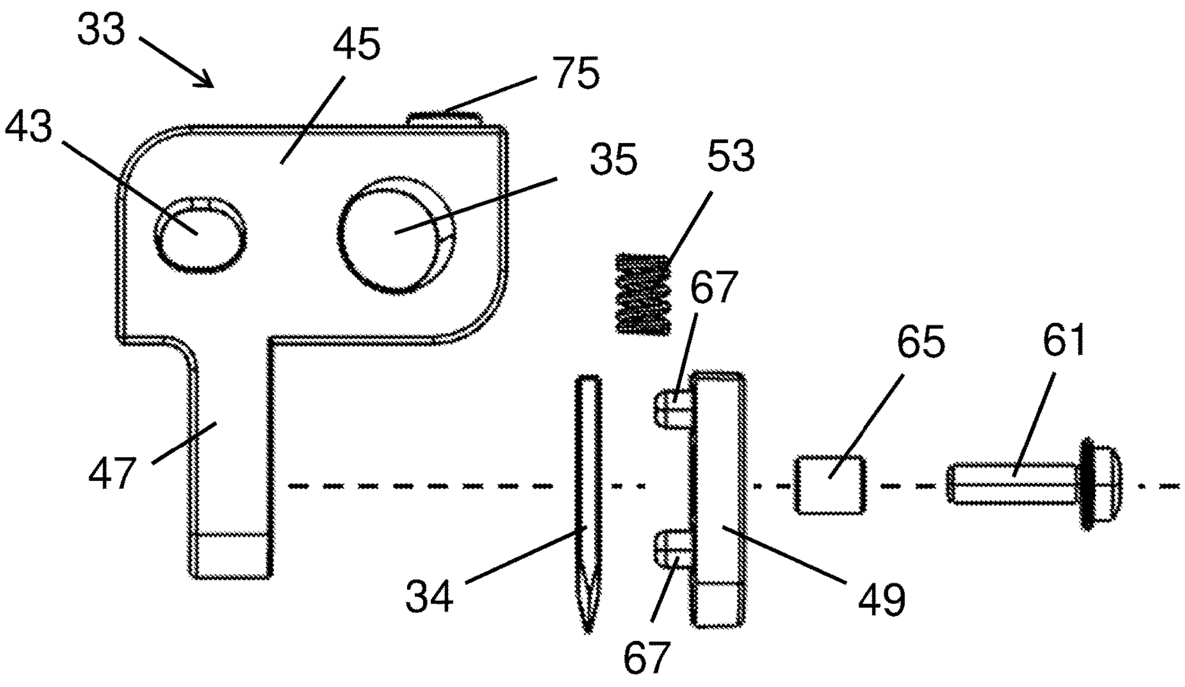
Figure 6A:
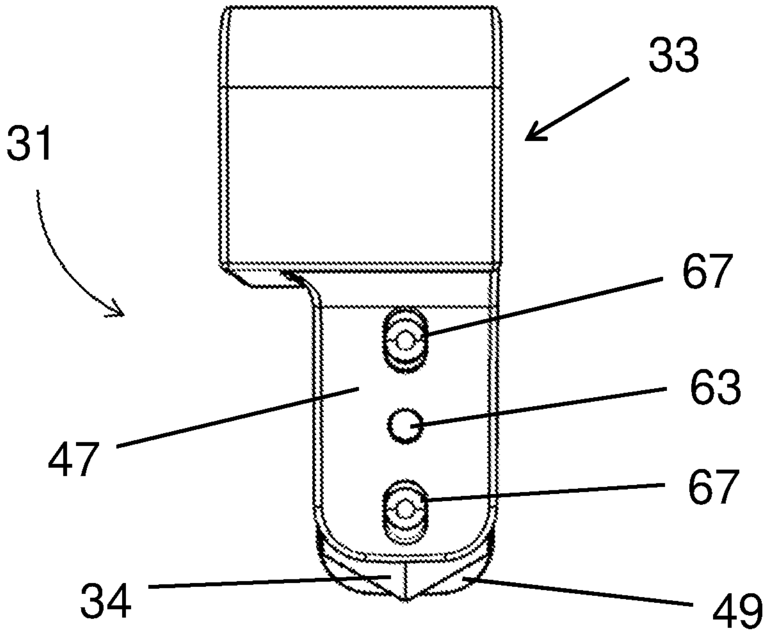
FIGS. 6A, B the blade unit of FIG. 4A in a rear view and in a representation in which the assembly is removed.
Figure 6B:
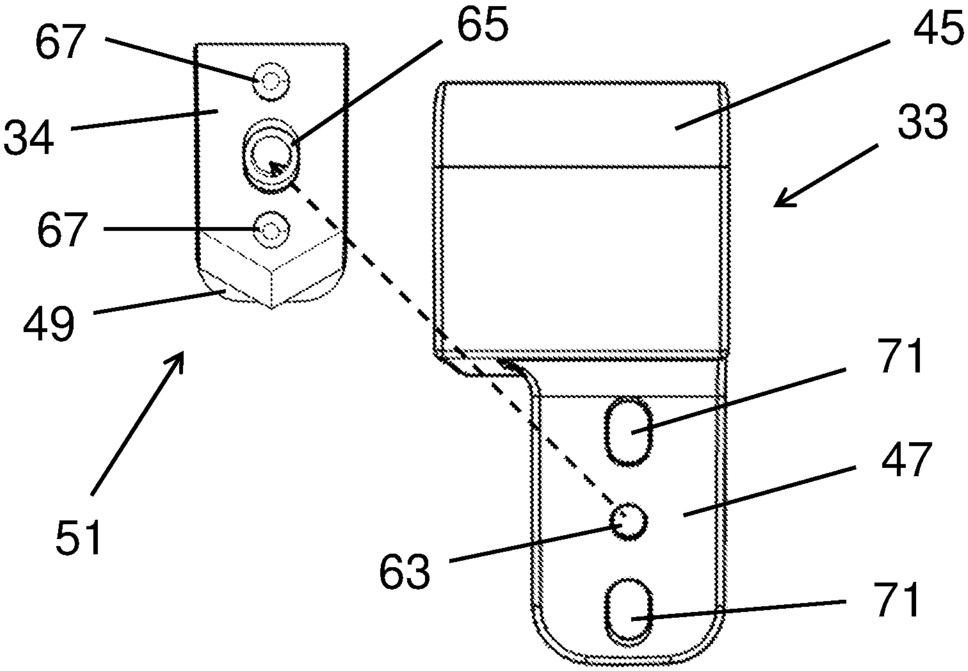
Figure 7:
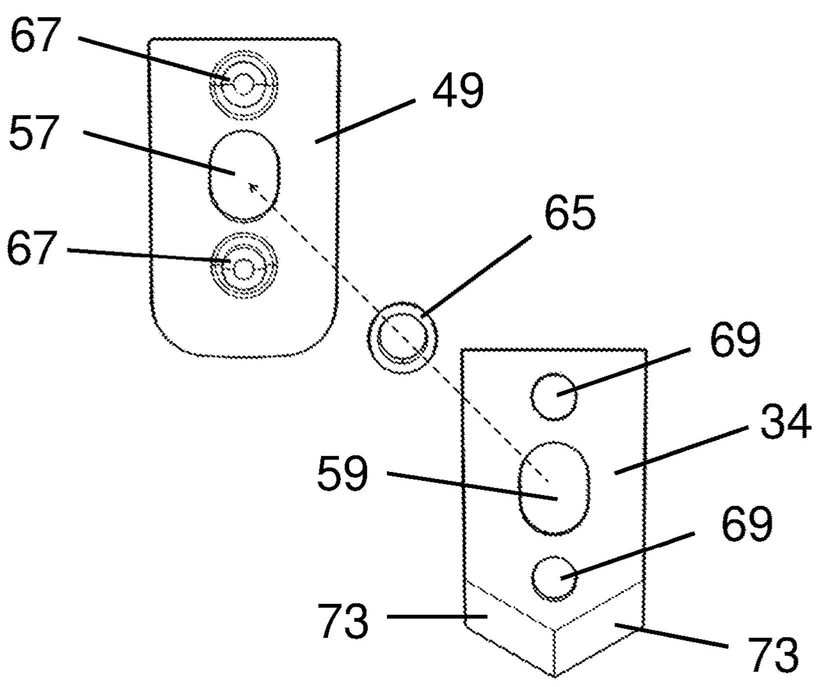
FIG. 7 the assembly of FIG. 6B in an exploded representation.

As can in particular be seen from FIG. 4A (and also from FIGS. 5A, 6A and 8A), the cutting blade 34 projects with a defined overhang d over the blade holder 49, in particular an end face 56 of the blade holder 49 disposed in the direction toward the transport roller 29. The penetration depth of the cutting blade 34 into the endless tape labels thus always remains the same. This also applies in the case of tolerance-induced irregularities in the surface of the transport roller 29. The overhang d is in this respect adapted to the thickness of the labels and is selected such that the labels can be safely cut off from the endless tape. For example, the overhang can adopt a value of between 0.1 mm and 0.8 mm, preferably between 0.2 mm and 0.3 mm.

The blade unit 31 is preferably oriented such that, on the travel of the blade carriage 33, the cutting blade 34 or the tip of the cutting blade 34 runs along a surface line of the transport roller 29 that is disposed closest to the cutting blade 34 or the tip of the cutting blade 34. However, it is generally also possible that, on the travel of the blade carriage 33, the cutting blade 34 or the tip of the cutting blade 34 runs along a surface line of the transport roller 29 that has a predefined offset from the surface line disposed the closest.

The displaceable fastening of the assembly 51 comprising the blade holder 49 and the cutting blade 34 is ensured by an elongate hole arrangement. For this purpose, a respective elongate hole 57, 59 is formed in the blade holder 49 and the cutting blade 34, which elongate holes 57, 59 are arranged congruently with one another and through which a fastening screw 61 extends such that the assembly 51 is displaceable along the two elongate holes 57, 59. The fastening screw 61 is fixedly screwed in a fastening hole 33 formed in the prolongation 47 of the blade carriage 33.

So that the assembly 51 is not immovably stuck at the prolongation 47, the assembly 51 is received with clearance between the head of the fastening screw 61 and the prolongation 47 in the axial direction of the fastening screw 61. The clearance is achieved in that a spacer sleeve 65 is provided whose extent in the axial direction of the fastening screw 61 is greater than the corresponding extent of the assembly 51 and through which the shaft of the fastening screw 61 is inserted such that the spacer sleeve 65 also extends through the two elongate holes 57, 59. The head of the fastening screw 61 abuts the spacer sleeve 65 at the one axial end and the prolongation 47 of the blade carriage 33 abuts said spacer sleeve 65 at the other axial end.

The blade holder 49 and the cutting blade 34 are plugged together to form the assembly 51. For this purpose, the blade holder 49 has two pins 67 that project in the direction of the cutting blade 34 and that engage into corresponding openings 69 formed in the cutting blade 34. These two plug-in connections are disposed opposite one another with respect to the fastening screw 61 or the spacer sleeve 65. The two pins 67 of the blade holder 49 extend through the two openings 69 formed in the cutting blade 34 and each engage into a corresponding elongate hole 71 formed in the prolongation 47. It can hereby be reliably prevented that the assembly 51 rotates about the longitudinal axis of the fastening screw 61 or of the spacer sleeve 65.

The blade carriage 33 is travelable to and fro between a first end position to the right of the transport roller 29 (cf. FIG. 8A) and an analogous second end position to the left of the transport roller 29 (not shown) and can cut off labels in both directions of travel. For this purpose, the cutting blade 34 has a blade edge 73 at the respective leading edge in both directions of travel of the blade carriage 33. The two blade edges 73 together form a V shape in the plane of movement of the cutting blade 34 on the travel of the blade carriage 33, whereby a particularly good cutting result can be achieved. Before a change of the direction of travel, the endless tape labels 55 are transported further step-wise in a motorized manner, in each case by one label.

Figure 9:
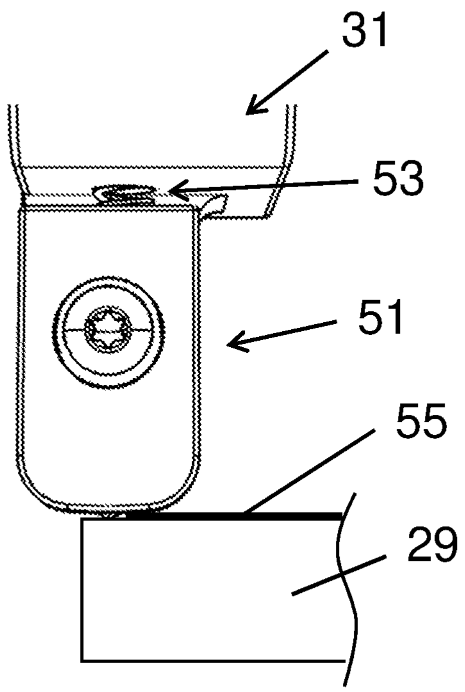
FIG. 9 the blade unit in accordance with FIGS. 8A and 8B in a target position.

An alternative method of cutting off the endless tape labels 55 is shown in FIG. 9. In the alternative method, a label is first printed, then the endless tape labels are transported further by one label, and the blade unit 31 or the blade carriage 33 is subsequently linearly traveled between a start position that corresponds to the aforementioned first end position of the blade carriage 33 (cf. FIG. 8A) and a target position as shown in FIG. 9. As can be seen from FIG. 9, the cutting blade 34 is located to the left of the left edge of the endless tape labels 55, i.e. the label to be cut off has been completely cut off. However, in the target position in accordance with FIG. 9, the cut-off label is held by the blade unit 31 at the transport roller 29 and can then be removed by an operator there.

The holding of the cut-off label in the target position of the blade unit 31 is achieved in that the endless tape labels 55 are disposed on the transport roller 29 with their lower sides and, on the travel of the blade unit 31 from the start position into the target position, are clamped between the end face 56 of the blade holder 49, which is disposed in the direction toward the transport roller 29 and which is disposed on the upper side of the endless tape labels 55, and the transport roller 29. This then in particular also applies to the cut-off label in the target position of the blade unit 31. Finally, the blade unit 31 or the blade carriage 33 is not completely traveled into the aforementioned second end position, but only so far that the end face 56 of the blade holder 49, with a trailing section, is still located in the region of the endless tape labels 55 or of the cut-off label. On the travel of the blade unit 13, the cutting blade 34 is slidingly seated on the surface of the transport roller 29.

In this respect, it is advantageous if, on the travel of the blade unit 31, the end face 56 of the blade holder 49 runs along a surface line of the transport roller 29 that is disposed the closest to the end face 56 of the blade holder 49 since the cut-off label can hereby be held particularly well. The cutting blade 34 or the tip of the cutting blade 34 then runs along a surface line of the transport roller 29 that is offset, in particular slightly offset, therefrom.

It is then waited until the cut-off label is removed by an operator. For this purpose, a detector device, not shown, is provided by which it is detected whether the cut-off label has been removed by an operator. Only when this is the case does the blade unit 31 automatically travel out of the target position. The blade unit 31 can in this respect either return to the start position or travel further into a further start position, which goes beyond the target position and which corresponds to the aforementioned second end position, and the endless tape labels 55 can be retracted up to the respective label start at which the label was cut off (reversing) before the printing of the next label that has already partly run through the printing region. Then, the method steps explained above are repeated for the next label to be cut off.

If the blade unit 31 has traveled further into the further start position, the blade unit 31, in order to cut off the next label, in this respect travels in the opposite direction of travel, i.e. in the direction of the start position, up to and into a further target position (not shown) that corresponds to the position shown in FIG. 9, but at the right edge of the endless tape labels 55. Therefore, the blade unit 31 is again not completely traveled back into the first end position, but only so far that the end face 56 of the blade holder 49, with a trailing section, is still located in the region of the endless tape labels 55 such that the next cut-off label is also held at the transport roller 29. After the removal of the next label, the blade unit 31 then returns completely to the start position.

To calibrate the start position of the blade unit 31, a reference travel of the blade unit 31 takes place on the switching on of the label printer 19. For this purpose, the blade unit 31 is provided with a magnet 75 that cooperates with a stationary magnetic field sensor 77, in particular a Hall sensor, that detects the magnet 75 moving past (cf. FIG. 3).

Figure 10:
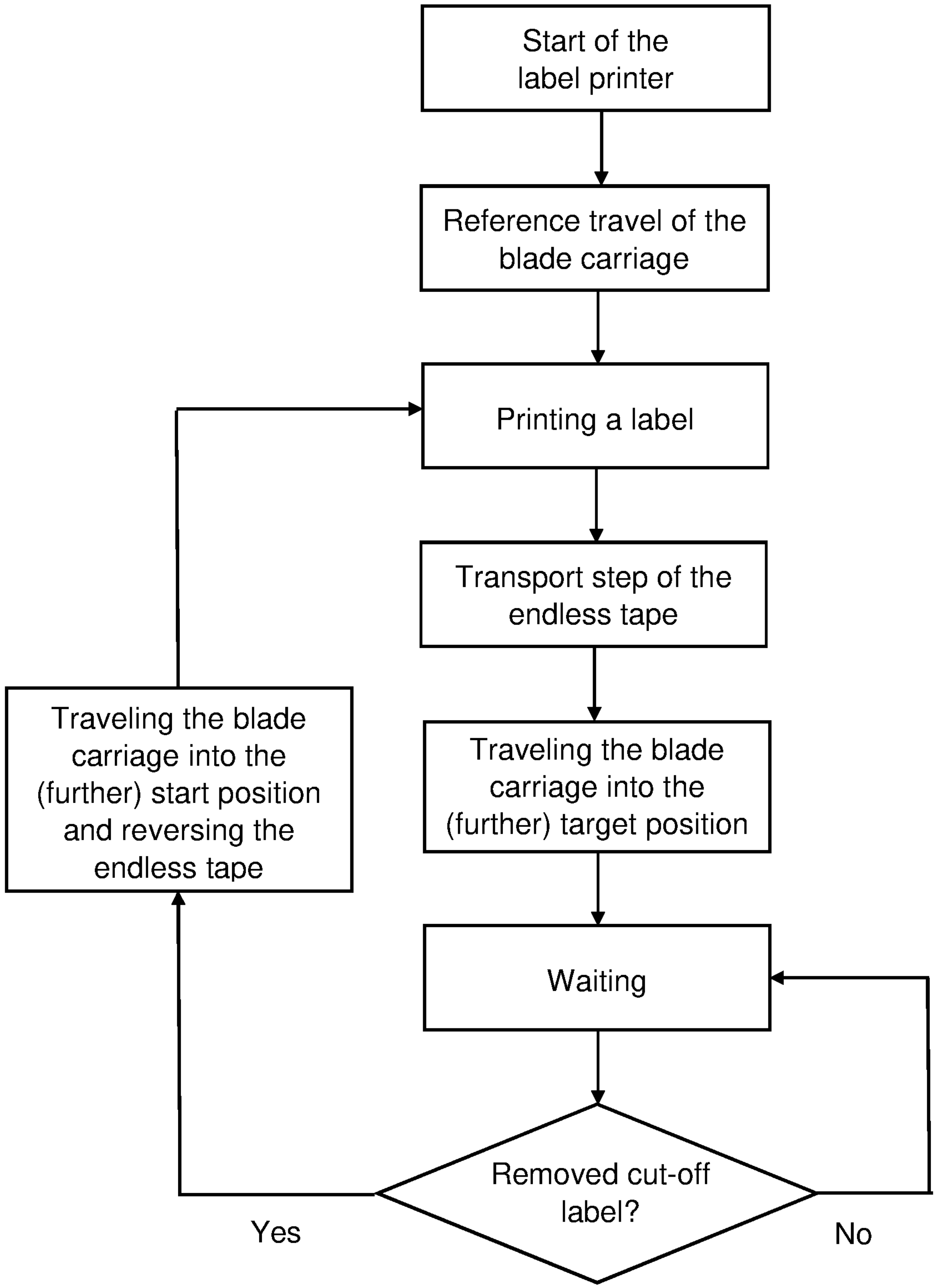
FIG. 10 a method of cutting off endless tape labels.

A flowchart that illustrates the method steps explained above is shown in FIG. 10, wherein the method steps are controlled or executed by the control device 20. The alternative method can also be performed with carrier tape labels in which the labels are applied to a carrier tape.

Figure 11:
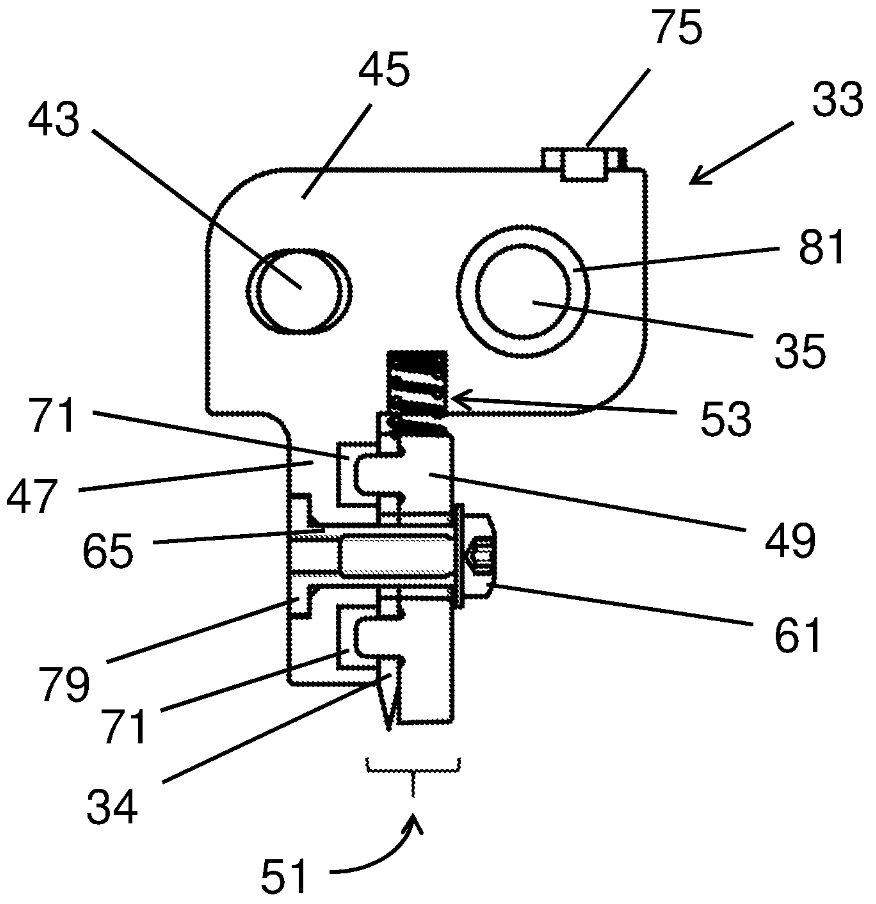
FIG. 11 an alternative blade unit in a cut side view.

In FIG. 11, a blade unit 31 alternative to the blade unit 31 explained in the previous Figures is shown. Unlike in the previous blade unit 31, in the blade unit 31 in accordance with FIG. 11, the spacer sleeve 65 not only extends through the assembly 51, but also through the prolongation 47 of the blade carriage 33. In particular, the spacer sleeve 65 of the blade unit 31 in accordance with FIG. 11, with the other axial end, does not abut the side of the prolongation 47 facing the assembly 51, but rather, with a flange 79 formed at this end, abuts the oppositely disposed side of the prolongation 47. Furthermore, the fastening screw 61 of the blade unit in accordance with FIG. 11 is not screwed in the prolongation 47, but rather in the spacer sleeve 65. To enable the aforementioned clearance of the assembly 51, the extent of the spacer sleeve 65 in the axial direction of the fastening screw 61 is greater than the common extent of the assembly 51 and of the prolongation 47 of the blade carriage 33.

The alternative blade unit 31 in accordance with FIG. 11 has the advantage that no fastening hole having an internal thread is required in the prolongation 47. This is in particular of advantage when the blade carriage 33 comprising the prolongation 47 is produced from a plastic. For the same reason, in the blade unit 31 in accordance with FIG. 11, an insert sleeve 81 is also provided in the passage 35. The spacer sleeve 65 and the insert sleeve 81 can be produced from a metal that can be provided with an internal thread for the fastening screw 61 or for the threaded rod 37 in a simple manner. In another respect, in the alternative blade unit 31 in accordance with FIG. 11, the two elongate holes 71 are indeed formed as countersunk elongate holes, but they can just as well formed as continuous elongate holes.

REFERENCE NUMERAL LIST

11 store scale
13 load plate
15 customer display
17 operator touch screen
19 label printer
20 control device
21 flap
22 cover section
23 receiver
25 deflection roller
27 cutter
28 cover plate
29 transport roller
31 blade unit
33 blade carriage
34 cutting blade
35 passage
37 threaded rod
39 electric motor
41 guide bar
43 aperture
45 base body
47 prolongation
49 blade holder
51 assembly
53 spring device
55 endless tape labels
56 end face
57 elongate hole
59 elongate hole
61 fastening screw
63 fastening hole
65 spacer sleeve
67 pin
69 opening
71 elongate hole
73 blade edge
75 magnet
77 magnetic field sensor
79 flange
81 insert sleeve
d overhang

The invention claimed is:

1. A cutter for self-adhesive linerless endless tape labels, said cutter comprising a transport roller, which is rotatable about an axis of rotation, and a blade unit that comprises a blade carriage, which is linearly travelable in parallel with the axis of rotation of the transport roller, and a cutting blade that is rotationally fixedly held at the blade carriage and that is directed in the direction toward the transport roller, wherein the endless tape labels are led between the transport roller and the blade unit, wherein the blade unit comprises a blade holder that forms an assembly with the cutting blade, in which assembly the cutting blade projects with a fixed overhang over an end face of the blade holder, with the assembly being displaceably fastened to the blade carriage and a spring device being provided that preloads the assembly into an extended position, wherein the blade unit comprises a fastening screw by which the assembly is displaceably fastened to the blade carriage, with the assembly being received with clearance between a head of the fastening screw and the blade carriage in an axial direction of the fastening screw, and wherein the blade unit comprises a spacer sleeve that at least extends through the assembly, with a shaft of the fastening screw at least extending into the spacer sleeve, and with the head of the fastening screw abutting an axial end of the spacer sleeve to enable the clearance.

2. The cutter in accordance with claim 1, wherein the blade holder and the cutting blade are each plate-shaped, with the blade holder and the cutting blade contacting one another; and/or wherein the cutting blade is arranged between the blade carriage and the blade holder.

3. The cutter in accordance with claim 1, wherein the blade carriage has a base body and a plate-shaped prolongation, which projects from the base body in the direction toward the transport roller and to which the assembly is displaceably fastened.

4. The cutter in accordance with claim 3, wherein the flat sides of the plate-shaped prolongation are aligned in parallel with a plane of movement of the cutting blade on the travel of the blade carriage and/or are aligned in parallel with the plane of movement of the cutting blade on the displacement of the assembly.

5. The cutter in accordance with claim 1, wherein the spring device is supported at the blade carriage, on the one hand, in particular at a base body of said blade carriage, and at the assembly, on the other hand; and/or wherein the spring device acts directly on both the blade holder and the cutting blade.

6. The cutter in accordance with claim 1, wherein the spacer sleeve includes a second axial end, the second axial end, abuts a side of the blade carriage facing the assembly and the shaft of the fastening screw extends through the spacer sleeve up to and into the blade carriage with the fastening screw being screwed in the blade carriage and with an extent of the spacer sleeve being greater in the axial direction than an extent of the assembly.

7. The cutter in accordance with claim 1, wherein the spacer sleeve extends through the assembly and the blade carriage and said spacer sleeve, with a flange formed at its other axial end, abuts a side of the blade carriage remote from the assembly, with the fastening screw being screwed into the spacer sleeve, and with the extent of the spacer sleeve being greater in the axial direction than the common extent of the assembly and of the blade carriage.

8. The cutter in accordance with claim 1, wherein the blade holder and the cutting blade form the assembly, with the blade holder having at least one pin projecting in the direction of the cutting blade and the cutting blade having at least one opening receiving the respective pin.

9. The cutter in accordance with claim 8, wherein the blade holder has two pins and the cutting blade has two openings that are disposed opposite one another with respect to the fastening screw.

10. The cutter in accordance with claim 8, wherein the respective pin of the blade holder extends through the respective opening of the cutting blade and up to and into a respective elongate hole formed in the blade carriage.

11. The cutter in accordance with claim 1, wherein the overhang amounts to a value that is between 0.1 mm and 0.8 mm.

12. The cutter in accordance with claim 1, wherein a threaded spindle, comprising a threaded rod and the blade carriage as a spindle nut, and an electric motor driving the threaded rod are provided to linearly travel the blade carriage.

13. The cutter in accordance with claim 12, wherein a straight-line guide extending in parallel with the threaded rod is provided in the form of a guide bar which extends through an aperture formed in the blade carriage and along which the blade carriage is guided in a linearly travelable manner.

14. The cutter in accordance with claim 1, wherein the blade carriage is travelable between a first end position and a second end position, with the cutting blade having a blade edge at the respective leading edge in both directions of travel of the blade carriage, with the two blade edges together forming a V shape in the plane of movement of the cutting blade on the travel of the blade carriage.

15. A label printer comprising a cutter for self-adhesive linerless endless tape labels in accordance with claim 1.

16. A label printer of claim 15, further comprising a scale.

17. The cutter in accordance with claim 1, wherein the spring device comprises a compression spring.

18. The cutter in accordance with claim 11, wherein the overhang amounts to a value that is between 0.2 mm and 0.3 mm.

19. A cutter for self-adhesive linerless endless tape labels, said cutter comprising a transport roller, which is rotatable about an axis of rotation, and a blade unit that comprises a blade carriage, which is linearly travelable in parallel with the axis of rotation of the transport roller, and a cutting blade that is rotationally fixedly held at the blade carriage and that is directed in the direction toward the transport roller, wherein the endless tape labels can be led between the transport roller and the blade unit, wherein the blade unit comprises a blade holder that forms an assembly with the cutting blade, in which assembly the cutting blade projects with a fixed overhang over the blade holder, with the assembly being displaceably fastened to the blade carriage and a spring device being provided that preloads the assembly into an extended position, wherein the blade unit comprises a fastening screw by which the assembly is displaceably fastened to the blade carriage, with the assembly being received with clearance between a head of the fastening screw and the blade carriage in an axial direction of the fastening screw, wherein the blade unit comprises a spacer sleeve that at least extends through the assembly, and wherein a first elongate hole is formed in the blade holder and a second elongate hole is formed in the cutting blade, wherein the two elongate holes are coordinated with another, and wherein the fastening screw extends through the two elongate holes, with the assembly being displaceable in the direction of the two elongate holes.

20. The cutter in accordance with claim 19, wherein the spring device comprises a compression spring.

21. The cutter in accordance with claim 19, wherein the fastening screw and the spacer sleeve extends through the elongate holes.

* * * * *